United States Patent
May et al.

(10) Patent No.: US 7,720,456 B2
(45) Date of Patent: May 18, 2010

(54) ADJUST SWITCHING RATE OF A POWER SUPPLY TO MITIGATE INTERFERENCE

(75) Inventors: Michael R. May, Austin, TX (US);
Marcus W. May, Austin, TX (US);
Matthew Brady Henson, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 481 days.

(21) Appl. No.: 11/355,477

(22) Filed: Feb. 16, 2006

(65) Prior Publication Data

US 2007/0191073 A1    Aug. 16, 2007

(51) Int. Cl.
*H04B 1/10* (2006.01)
(52) U.S. Cl. .................. 455/296; 455/302; 455/226.1; 455/67.11
(58) Field of Classification Search .......... 455/296, 455/298, 299, 300–302, 67.11–67.14, 226.1–226.4
See application file for complete search history.

(56) References Cited

U.S. PATENT DOCUMENTS

| | | | | |
|---|---|---|---|---|
| 5,079,410 A | * | 1/1992 | Payne et al. | 219/506 |
| 5,519,889 A | * | 5/1996 | Hipp | 455/297 |
| 6,505,035 B2 | * | 1/2003 | Ue et al. | 455/69 |
| 6,819,912 B2 | * | 11/2004 | Roeckner et al. | 455/296 |
| 7,142,819 B1 | * | 11/2006 | Kang et al. | 455/63.3 |
| 7,197,290 B2 | * | 3/2007 | Patel | 455/296 |
| 7,206,563 B1 | * | 4/2007 | Danielson et al. | 455/307 |
| 7,457,604 B2 | * | 11/2008 | Patel | 455/343.1 |
| 7,599,676 B2 | * | 10/2009 | Maxim | 455/296 |
| 2004/0085933 A1 | * | 5/2004 | Wang | 455/226.1 |
| 2005/0003773 A1 | * | 1/2005 | Cowley et al. | 455/150.1 |

* cited by examiner

*Primary Examiner*—Lana N Le
(74) *Attorney, Agent, or Firm*—Ingrassia, Fisher & Lorenz, P.C.

(57) ABSTRACT

A method for mitigating interference from a switched-mode power supply begins by comparing a channel of interest of a plurality of channels with a switching rate of a switch-mode power supply. The method continues when the channel of interest compares unfavorably to the switching rate by adjusting the switching rate of the switch-mode power supply until the channel of interest compares favorably to the switching rate.

18 Claims, 5 Drawing Sheets radio 10

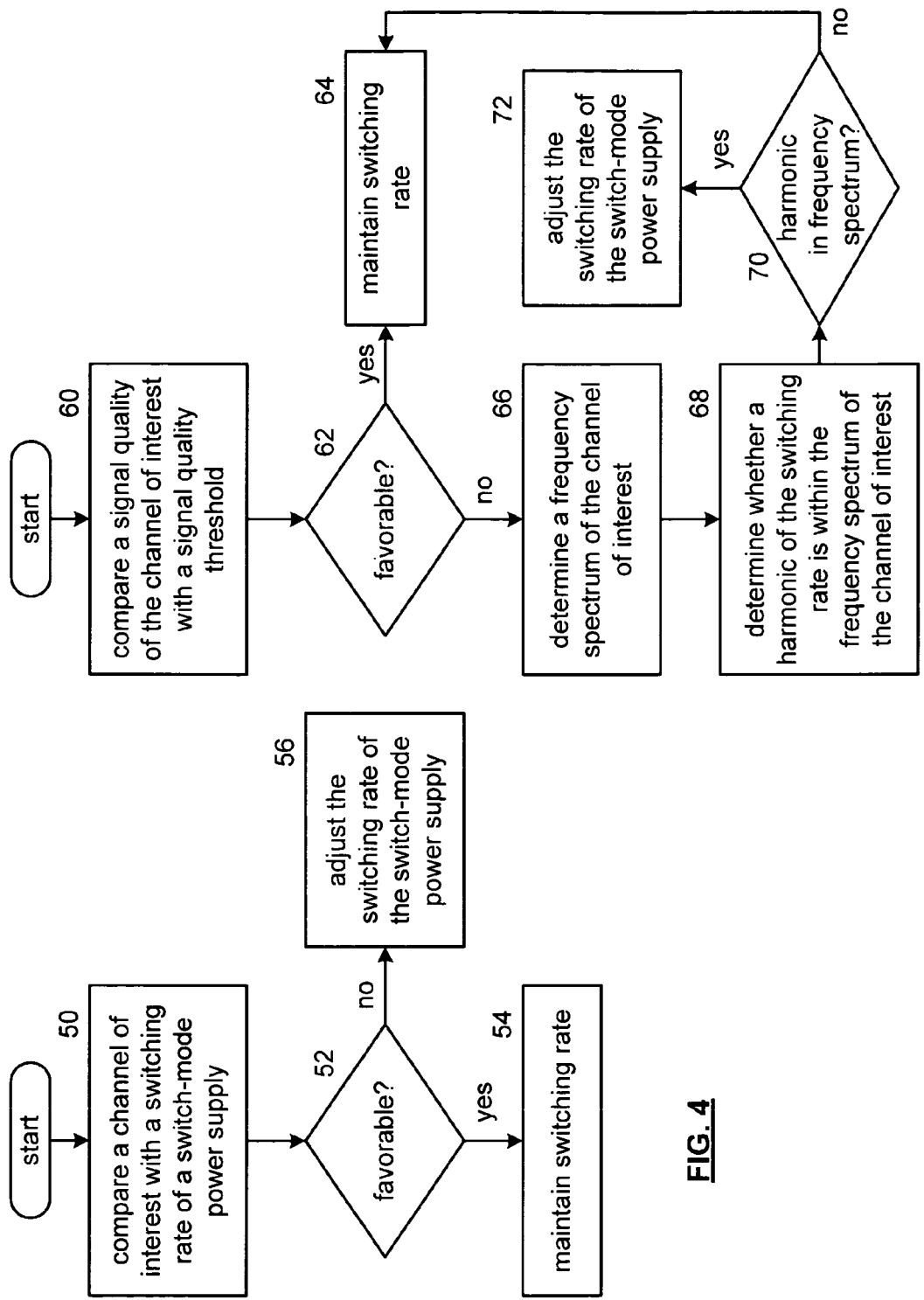

ADJUST SWITCHING RATE OF A POWER SUPPLY TO MITIGATE INTERFERENCE

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to radio receivers and more particularly to reducing receiver interference.

2. Description of Related Art

As is known, the general architecture of a radio includes a radio receiver and a processor. The radio receiver receives a radio frequency (RF) signal and converts it into a baseband signal. The processor recovers embedded data of the RF signal from the baseband signal.

To manufacture a commercially viable radio, the radio receiver should be designed to mitigate the adverse affects of interfering signals external to the radio (e.g., adjacent channel interference) and to mitigate the adverse affects of interference from within the radio. To reduce adjacent channel interference, the bandwidth of the radio receiver is relatively narrow such that signals outside of a frequency band of interest (i.e., adjacent channels) are substantially attenuated while signals within the frequency band of interest (i.e., the desired channel) are not attenuated. In addition, radio receivers include a plurality of techniques to reduce internal interference. For instance, radio receivers utilize component matching, synchronization, calibration, temperature compensation, etc.

One internal source of potential interference that has not been addressed is harmonics of the switching rate of a switch mode power supply falling within the frequency band of interest. In some applications, this is not an issue since the frequency band of interest is significantly greater than the switching frequency such that the harmonics that may fall within the frequency band of interest are of negligible magnitude and/or because the switch mode power supply is physically, and thus, electromagnetically isolated from the radio receiver (e.g., the power supply is implemented on a different integrated circuit than the radio receiver). However, as the frequency of switch mode power supplies increase and/or as integration of the switch mode power supply and radio receiver occurs, the harmonics of the switching rate of the switch mode power supply may adversely affect the performance of the radio receiver.

Therefore, a need exists for a method and apparatus to mitigate interference from a switch-mode power supply.

BRIEF DESCRIPTION OF THE SEVERAL VIEWS OF THE DRAWING(S)

FIG. 4 is a logic diagram of a method for mitigating interference from a switch mode power supply in accordance with the present invention;

FIG. 5 is a logic diagram of another method for mitigating interference from a switch mode power supply in accordance with the present invention.

DETAILED DESCRIPTION OF THE DRAWINGS

Figure 1:
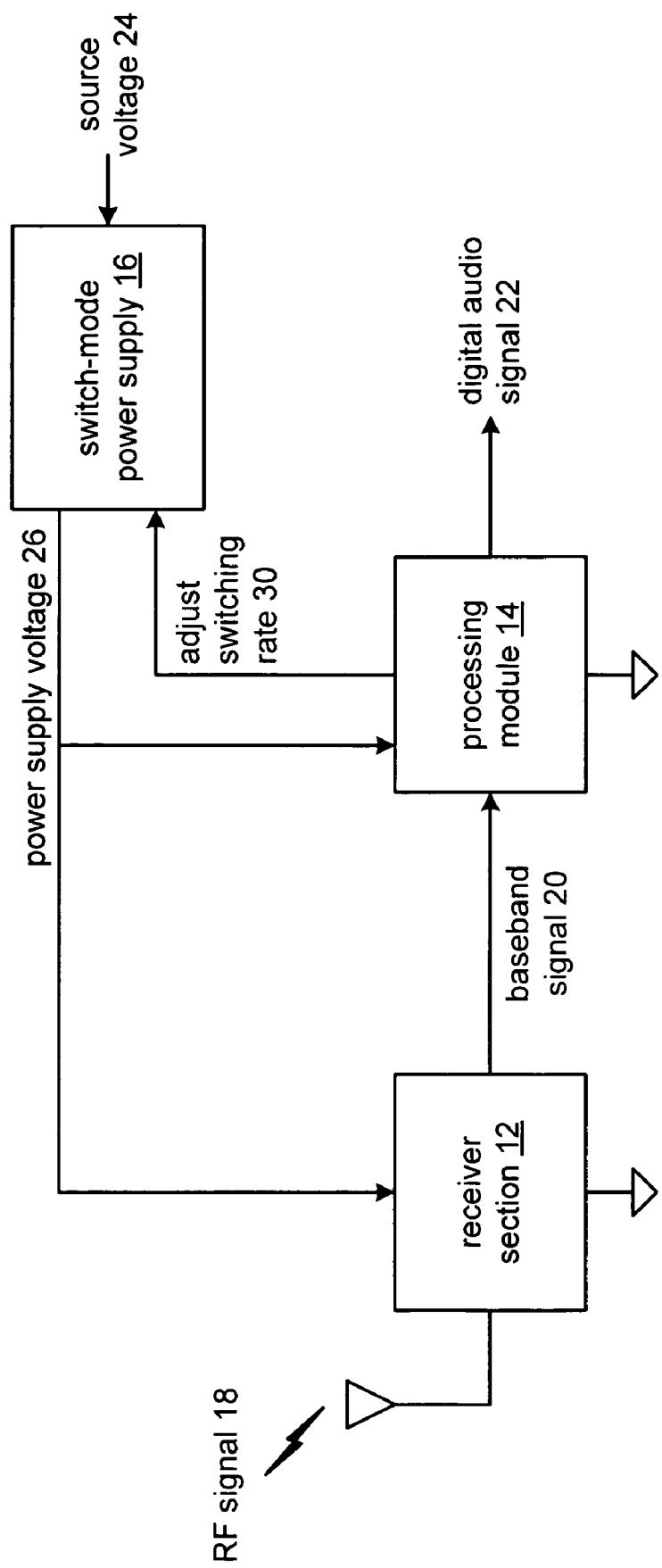
FIG. 1 is a schematic block diagram of a radio in accordance with the present invention.

FIG. 1 is a schematic block diagram of a radio 10 that includes a receiver section 12, processing module 14 and a switch mode power supply 16. The processing module 14 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The processing module 14 may further include an associated memory element that may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the processing module 32 executes, operational instructions corresponding to at least some of the steps and/or functions illustrated in FIGS. 1-6.

The receiver section 12 receives a radio frequency (RF) signal 18 and converts them into a baseband signal 20. In general, the receiver section 12 may include a low noise amplifier, down converting mixer section, and filters to convert the RF signals 18 into baseband signals 20. Note that the baseband signals 20 may have an intermediate carrier frequency ranging from 0 hertz (i.e., at baseband) to a few megahertz. The type of RF signals 18 may vary depending on the use of radio 10. For example, the RF signals 18 may be one or more of a plurality of RF channels, such as frequency modulated (FM) radio channels. Accordingly, the bandwidth of the receiver section 12 is optimized to receive and subsequently process RF signals 18 within a particular frequency band of interest. For example, for FM signals, the frequency band of interest ranges from approximately 76 MHz to 108 MHz.

The processing module 14 converts the baseband signals 20 into digital audio signals 22 or some other digitized signals based on the particular application of radio 10. The particular baseband processing performed by processing module 14 depends on the particular types of RF signals 18 and the corresponding standards to which they were created. For example, if the RF signals 18 correspond to FM signals, the baseband processing performed by processing module 14 corresponds to the FM standard.

The switch mode power supply 16 converts a voltage source 24 (e.g., a battery, a DC voltage source, an AC voltage source, et cetera) into a power supply voltage 26. The power supply voltage 26 may include one or more voltages that provide at least a portion of the power to the receiver section 12 and/or processing module 14. In general, a switch mode power supply 16 includes one or more switching transistors, an inductor, transformer or capacitor, a feedback loop, and control circuitry to regulate the power supply voltage 26 at a desired level. The rate at which the transistors of the switch mode power supply 16 operate at is generally referred to as the switching rate.

In some instances, harmonics of the switching rate may fall within the band of interest of a particular RF signal 18. When this occurs, the processing module 14 may adjust the switching rate 30 of the switch mode power supply 16 such that the harmonics of the switch mode power supply fall outside the frequency band of interest of a particular channel of RF signal 18. This will be described in greater detail with reference to FIGS. 2-6.

Figure 2:
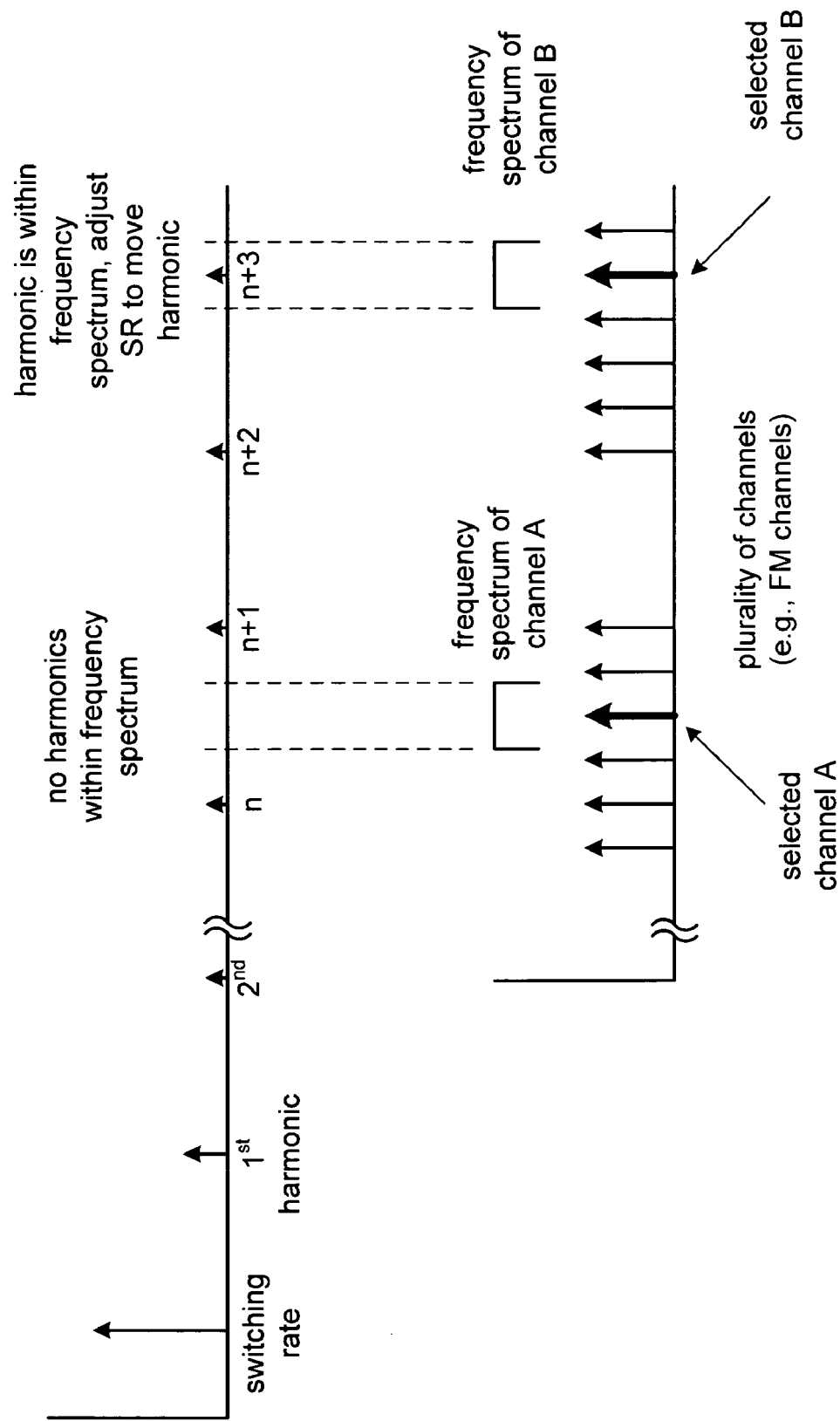
FIG. 2 is a diagram illustrating adjusting the switching rate of a switch mode power supply in accordance with the present invention.

FIG. 2 illustrates a graphical representation of adjusting the rate of the switch mode power supply 16 to avoid a harmonic thereof falling within the frequency spectrum, or frequency band of interest of a particular channel. As shown, the frequency spectrum of the switching rate includes a fundamental component at the frequency corresponding to the switching rate and a plurality of harmonics at multiples of the switching rate. The $2^{nd}$ frequency spectrum plot illustrates a plurality of channels that may be included within the RF signal 18. In one example, channel A is selected as the desired channel, which may be one of a plurality of FM radio channels. The receiver section 12 has a bandwidth that is represented by the frequency spectrum of channel A. In this example, the frequency spectrum of channel A (i.e., the bandwidth of the receiver tuned to receive channel A) does not include a harmonic of the switching rate of the switch mode power supply. In this instance, the switching rate of the power supply would be maintained since it is not producing an interfering harmonic.

In another example, channel B of the plurality of channels is selected. In this example, the frequency spectrum of channel B (i.e., the bandwidth of the receiver tuned to receive channel B) includes a harmonic of the switching rate within that frequency spectrum. In this instance, the switching rate of the power supply would be increased or decreased such that the harmonic is moved outside of the frequency spectrum of channel B. Note that the adjusting of the switching rate may be done on-the-fly (e.g., incremental adjustments of the switching rate and retesting of harmonics) or via a lookup table (e.g., for a given selected channel, adjust switching rate to a known rate that does not produce a harmonic with the frequency spectrum of the selected channel). For example, if the radio is an FM radio, a particular channel is selected, and the frequency spectrum of the selected channel is determined, the harmonics of the switching rate may be compared with the frequency spectrum of the selected channel to determine whether interference may occur. Alternatively, the processing module may include a lookup table that includes, for each of the plurality of channels, one or more switching rates that produces an interfering harmonic. From this data, a switching rate that does not include an interfering harmonic can be selected. As a further alternative, the processing module may include a lookup table that includes, for each of the plurality of channels, one or more switching rates that does not produce an interfering harmonic such that one of these switching rates may be selected.

Figure 3:
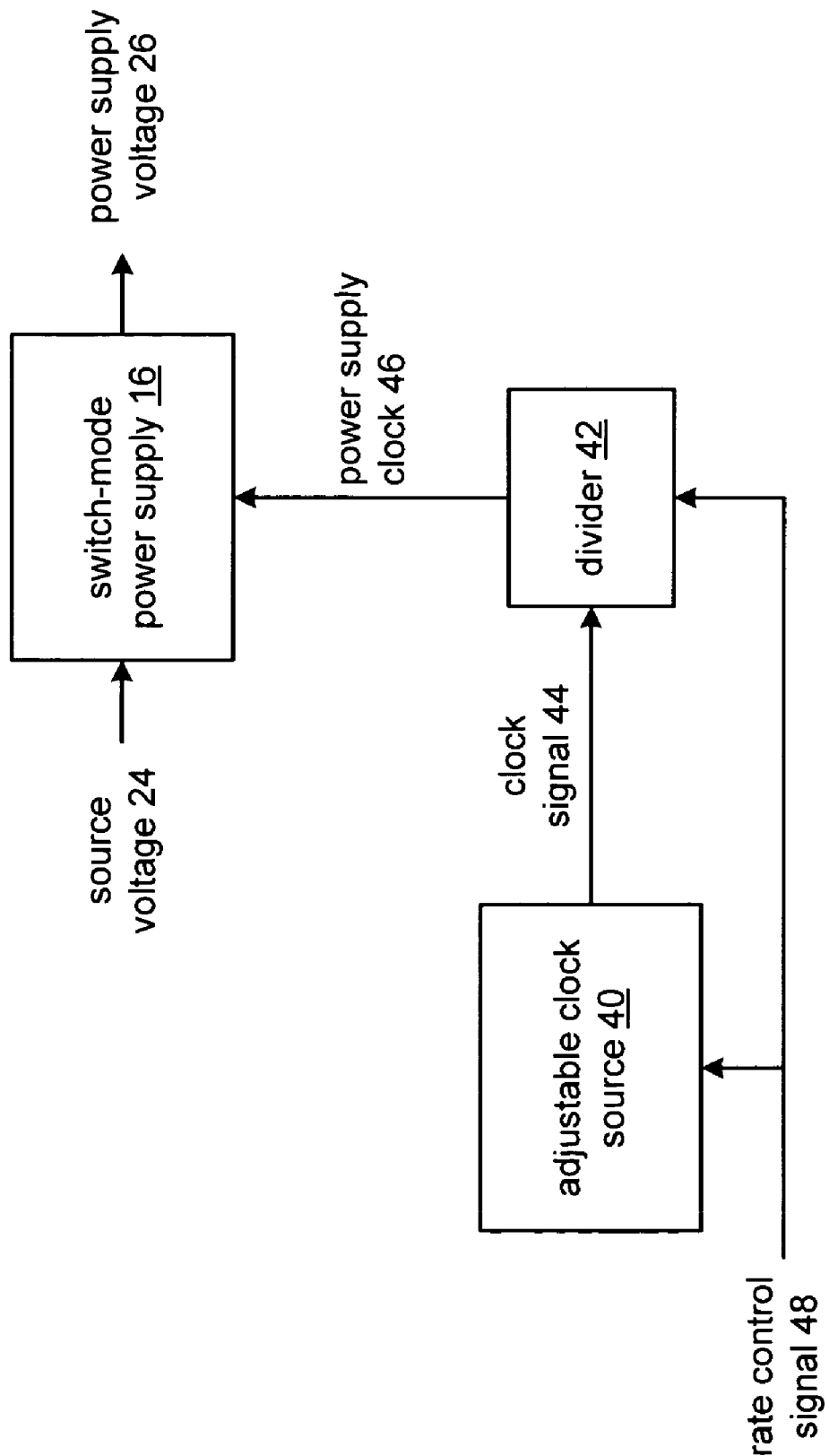
FIG. 3 is a schematic block diagram of an adjustable switching rate switch mode power supply in accordance with the present invention.

FIG. 3 is an example embodiment of an adjustable rate switch mode power supply 16. In this embodiment, an adjustable clock source 40 generates a clock signal 44 that may be subsequently divided via divider 42 to produce the power supply clock 46. The power supply clock 46 corresponds to the switching rate of the switch mode power supply 16.

In one embodiment, the processing module 14 may determine that the switching rate needs to be changed to avoid a harmonic interference. In this instance, the processing module 14 generates a rate control signal 48 that adjusts the adjustable clock source 40, which may be phase locked loop having a programmable output frequency, and/or the divider 42 to produce the desired switching rate. Note that the divider 42 may be omitted if the adjustable clock source 40 is an independent clock source for the switch mode power supply 16. Note that the independent clock source 40 may be synchronized with a system clock of the radio. Further note, that there are a variety of ways in which to adjust the switching rate of the switch mode power supply and the embodiment of FIG. 3 is just one of the variety of ways.

FIG. 4 is a logic diagram of a method for mitigating interference with a switch mode power supply that begins at Step 50. At Step 50, a channel of interest is compared with a switching rate of a switch mode power supply. In one embodiment, the channel of interest is one of a plurality of channels such as FM radio channels wherein the corresponding carrier frequency is compared with the switching rate of the switch mode power supply. The process then proceeds to Step 52 where a determination is made as to whether the comparison of Step 50 is favorable. If the comparison is favorable, the process proceeds to Step 54 where the switching rate of the switch mode power supply is maintained.

If, however, the comparison of Step 52 was not favorable, the process proceeds to Step 56 where the switching rate of the switch mode power supply is adjusted. In one embodiment, the switching rate may be adjusted by adjusting a clock from which the switching rate is derived. The adjustment of the clock may be done with digital circuitry or software code that implements a logic function or a lookup table. In another embodiment, the switching rate may be programmed based on the channel of interest such that once the channel of interest is known, the switching rate is programmed to a switching rate that does not produce an interfering harmonic. In yet another embodiment, the switching rate may be incrementally adjusted and Steps 50, 52 and 56 are repeated until a favorable comparison is achieved.

FIG. 5 illustrates a logic diagram of another method for mitigating interference from a switch mode power supply. The process begins at Step 60 where a signal quality (e.g., signal to noise ratio (SNR), signal to interference ratio (SIR), received signal strength indication (RSSI), etc.) of the channel of interest is compared with a signal quality threshold. The process then proceeds to Step 62 where a determination is made as to whether the comparison at Step 60 was favorable (e.g., the SNR exceeds a threshold (e.g., 40 dB), the SIR exceeds a threshold (e.g., 40 dB), and/or the RSSI exceeds a threshold). If yes, the process proceeds to Step 64 where the switching rate of the switch mode power supply is maintained. In this instance, the signal quality of the received signal is at such a level where the interference that may be produced by the switch mode power supply or a harmonic thereof, is negligible in comparison to the signal strength of the received signal.

If, however, the comparison at Step 62 was unfavorable, the process proceeds to Step 66 where a frequency spectrum of the channel of interest is determined. In general, the frequency spectrum of the channel of interest corresponds to the bandwidth of the receiver tuned to receive the selected channel of interest. In one embodiment, the frequency spectrum may be determined utilizing a lookup table or logical function implemented in either digital gates or software code.

The process then proceeds to Step 68 where a determination is made as to whether a harmonic of the switching rate of the switch mode power supply is within the frequency spectrum of the channel of interest. If, at Step 70, the harmonic is not within the frequency spectrum, the process proceeds to Step 64 where the switching rate is maintained. If, however, the harmonic is within the frequency spectrum, the process proceeds to Step 72 where the switching rate of the switch mode power supply is adjusted.

Figure 6:
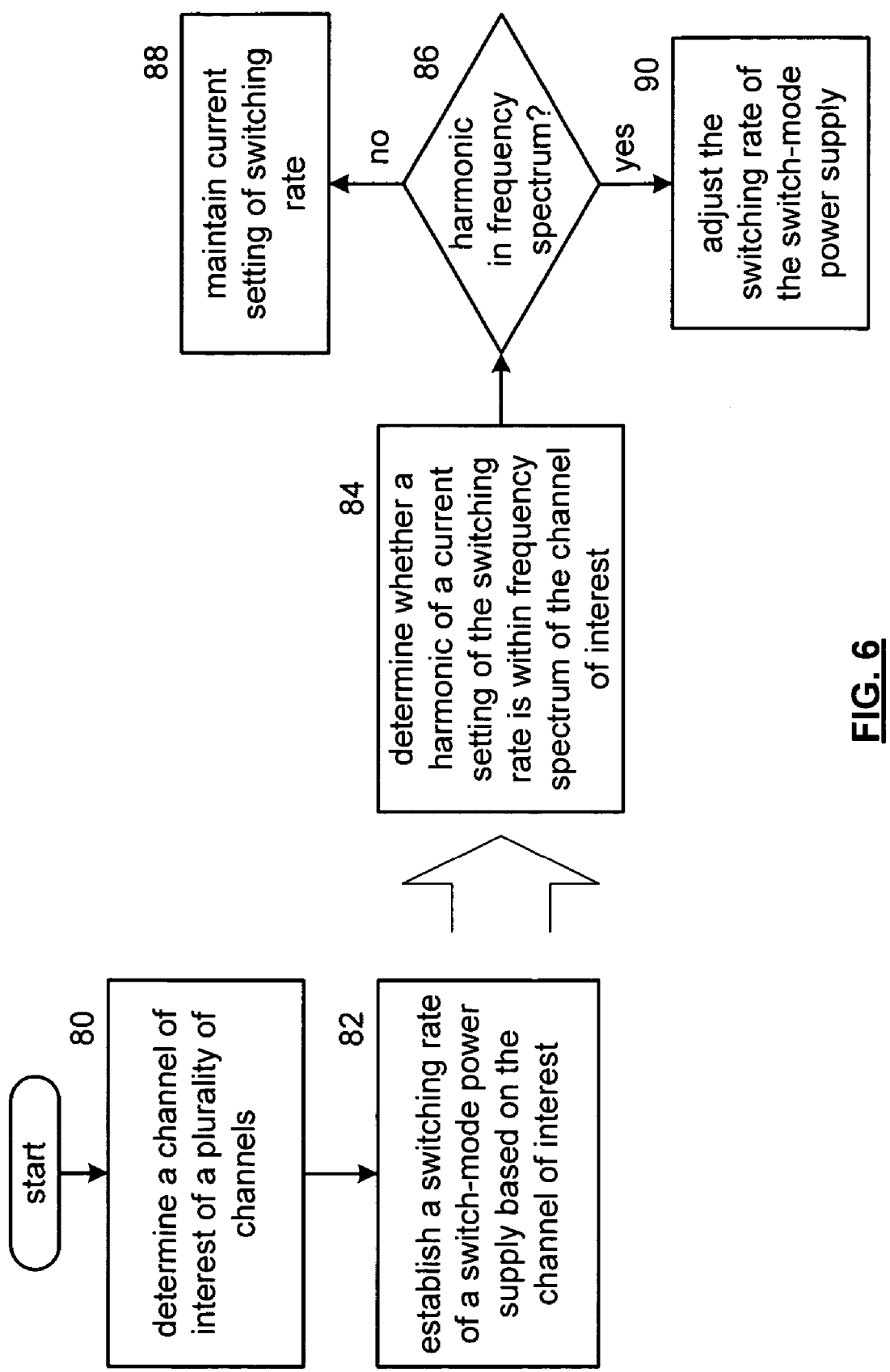
FIG. 6 is a logic diagram of yet another method for mitigating interference from a switch mode power supply in accordance with the present invention.

FIG. 6 is a logic diagram of another method for mitigating interference from a switch mode power supply. The process begins at Step 80 where a channel of interest of a plurality of channels is determined. In one embodiment, the plurality of channels corresponds to a plurality of FM radio stations. The process then proceeds to Step 82 where a switching rate of a switch mode power supply is established based on the channel of interest. This may be done as shown in Steps 84-90.

At Step 84, a determination is made as to whether a harmonic of a current setting of the switching rate of the switch mode power supply is within a frequency spectrum of the channel of interest. The process then proceeds to Step 86 where the method branches based on whether the harmonic is within the frequency spectrum. If not, the process proceeds to Step 88 where the current setting of the switching rate is maintained. If, however, the harmonic is within the frequency spectrum, the process proceeds to Step 90 where the switching rate of the switch mode power supply is adjusted.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The preceding discussion has presented a method and apparatus for mitigating interference that may be produced by a switch mode power supply within a radio. As one of ordinary skill in the art will appreciate, other embodiments may be derived from the teachings of the present invention without deviating from the scope of the claims.

What is claimed is:

1. A method for mitigating interference from a switched-mode power supply to a channel of interest having a frequency spectrum, wherein the method comprises:
    comparing a signal quality of a channel of interest with a signal quality threshold;
    when the signal quality compares favorably with the signal quality threshold, maintaining the switching frequency;
    when the signal quality compares unfavorably with the signal quality threshold, selecting a new switching frequency for the switched-mode power supply from a plurality of available switching frequencies stored in a lookup table based on the channel of interest, wherein the new switching frequency is selected so that the frequencies of harmonics produced by the new switching frequency are outside of the frequency spectrum of the channel of interest and adjusting the switching frequency of the switch-mode power supply to the new switching frequency obtained from the lookup table.

2. The method of claim 1, wherein the selecting comprises:
    determining whether any of the harmonics of the switching frequency of the switched-mode power supply are within the frequency spectrum of the channel of interest; and
    when the harmonic is within the frequency spectrum of the channel of interest, adjusting the switching rate of the switched-mode power supply such that the harmonics of the switching rate are not within the frequency spectrum.

3. The method of claim 2 wherein adjusting the switching frequency comprises: adjusting a clock rate of a clock source from which the switching frequency is derived.

4. The method of claim 1 wherein the channel of interest is selected from a plurality of channels each corresponding to a radio station, and wherein the lookup table comprises, for each of the radio stations, a known switching frequency for the switched mode power supply that does not produce a harmonic within a frequency spectrum of the radio station.

5. A method comprises:
    comparing a signal quality of a channel of interest with a signal quality threshold;
    when the signal quality compares favorably with the signal quality threshold, maintaining the switching frequency; and
    when the signal quality compares unfavorably with the signal quality threshold, referencing a lookup table to thereby determine a new switching frequency of a switch-mode power supply based on the channel of interest from a plurality of available switching frequencies stored in the lookup table; and
    adjusting the switching frequency of the switch-mode power supply to the new switching frequency.

6. The method of claim 5, wherein the plurality of channels comprises: a plurality of stations within a frequency modulation (FM) radio band, wherein the channel of interest corresponds to a selected one of the plurality of stations.

7. The method of claim 5, further comprising: determining whether a current setting of the switching frequency produces at least one harmonic of the switching frequency within a frequency spectrum of the channel of interest; and when the current setting of the switching rate produces at least one harmonic within the frequency spectrum of the channel of interest, switching to the new switching frequency such that harmonics of the switching rate are not within the frequency spectrum of the channel of interest.

8. The method of claim 7 further comprises: when the current setting of the switching frequency does not produce at least one harmonic within the frequency spectrum of the channel of interest, maintaining the current setting of the switching frequency.

9. The method of claim 5 wherein the channel of interest is selected from a plurality of channels each corresponding to a radio station, and wherein the lookup table comprises, for each of the radio stations, a known switching frequency for the switched mode power supply that does not produce a harmonic within a frequency spectrum of the radio station.

10. A radio comprises:
a receiver section operably coupled to convert a radio signal into a baseband signal, wherein the radio signal corresponds to a channel of interest;
a switched-mode power supply operably coupled to convert a source voltage into a power supply voltage at a switching frequency, wherein the receiver section is at least partially powered by the power supply voltage;
a processing module operably coupled to: compare a signal quality of the channel of interest with a signal quality threshold, to maintain the switching frequency when the signal quality compares favorably with the signal quality threshold, and, when the signal quality compares unfavorably with the signal quality threshold, to reference a lookup table to thereby determine a new switching frequency of the switch-mode power supply from a plurality of available switching frequencies stored in the lookup table based on the channel of interest, wherein the new switching frequency is selected so that the frequencies of harmonics produced by the new switching frequency are outside of the channel of interest, and wherein the processing module is further configured to adjust the switching frequency of the switch-mode power supply to the new switching frequency.

11. The radio of claim 10, wherein the processing module further functions to compare the channel of interest with the switching frequency by: determining whether a harmonic of the switching frequency of the switched-mode power supply is within a frequency spectrum of the channel of interest; and when the harmonic is within the frequency spectrum of the channel of interest, adjusting the switching frequency of the switched-mode power supply such that the harmonic and other harmonics of the switching frequency are not within the frequency spectrum.

12. The radio of claim 11 further comprises: an adjustable clock source for producing a clock signal based on a frequency control signal, wherein the switching frequency is derived from the clock signal; and wherein the processing module further functions to adjust the switching frequency by: adjusting the frequency control signal such that the adjustable clock source produces the clock signal at a different frequency.

13. The radio of claim 10 wherein the channel of interest is selected from a plurality of channels each corresponding to a radio station, and wherein the lookup table comprises, for each of the radio stations, a known switching frequency for the switched mode power supply that does not produce a harmonic within a frequency spectrum of the radio station.

14. A radio comprises:
a receiver section operably coupled to convert a radio signal into a baseband signal, wherein the radio signal corresponds to a channel of interest, wherein the channel of interest has a frequency spectrum;
a switched-mode power supply operably coupled to convert a source voltage into a power supply voltage at a switching frequency, wherein the receiver section is at least partially powered by the power supply voltage; and
a processing module operably coupled to: compare a signal quality of the channel of interest with a signal quality threshold, to maintain the switching frequency when the signal quality compares favorably with the signal quality threshold, and, when the signal quality compares unfavorably with the signal quality threshold, to reference a lookup table to thereby determine a new switching frequency of the switch-mode power supply based on the channel of interest from a plurality of available switching frequencies stored in the lookup table, wherein the new switching frequency is selected so that the frequencies of harmonics produced by the new switching frequency are outside of frequency spectrum of the channel of interest, and to adjust the switching frequency of the switch-mode power supply to the new switching frequency.

15. The radio of claim 14, wherein wherein the channel of interest corresponds to a selected one of a plurality of stations within a frequency modulation (FM) radio band.

16. The radio of claim 14, wherein the processing module further functions to establish the switching frequency further by: determining whether a current setting of the switching frequency produces at least one harmonic of the switching frequency within a frequency spectrum of the channel of interest; and when the current setting of the switching frequency produces at least one harmonic within the frequency spectrum of the channel of interest, adjusting the switching frequency such that harmonics of the switching frequency are not within the frequency spectrum of the channel of interest.

17. The radio of claim 16, wherein the processing module further functions to: when the current setting of the switching frequency does not produce at least one harmonic within the frequency spectrum of the channel of interest, maintaining the current switching frequency.

18. The radio of claim 14 wherein the channel of interest is selected from a plurality of channels each corresponding to a radio station, and wherein the lookup table comprises, for each of the radio stations, a known switching frequency for the switched mode power supply that does not produce a harmonic within a frequency spectrum of the radio station.

* * * * *

UNITED STATES PATENT AND TRADEMARK OFFICE
CERTIFICATE OF CORRECTION

PATENT NO. : 7,720,456 B2  Page 1 of 1
APPLICATION NO. : 11/355477
DATED : May 18, 2010
INVENTOR(S) : Michael R. May et al.

It is certified that error appears in the above-identified patent and that said Letters Patent is hereby corrected as shown below:

Column 8, line 37, "wherein wherein" should be changed to --wherein--

Signed and Sealed this

Twentieth Day of July, 2010

David J. Kappos
*Director of the United States Patent and Trademark Office*